(12) United States Patent
Choi

(10) Patent No.: US 8,920,681 B2
(45) Date of Patent: Dec. 30, 2014

(54) ELECTRICALLY CONDUCTIVE POLYMERS WITH ENHANCED CONDUCTIVITY

(75) Inventor: Dong Hoon Choi, Seoul (KR)

(73) Assignee: Korea University Research and Business Foundation, Seoul (KR)

( * ) Notice: Subject to any disclaimer, the term of this patent is extended or adjusted under 35 U.S.C. 154(b) by 750 days.

(21) Appl. No.: 12/650,175

(22) Filed: Dec. 30, 2009

(65) Prior Publication Data

US 2011/0155962 A1 Jun. 30, 2011

(51) Int. Cl.
| | |
|---|---|
| H01B 1/00 | (2006.01) |
| B05D 5/00 | (2006.01) |
| C08G 75/00 | (2006.01) |
| H01B 1/12 | (2006.01) |
| C08F 234/04 | (2006.01) |

(52) U.S. Cl.
CPC .............. *H01B 1/127* (2013.01); *C08F 234/04* (2013.01); *Y10S 977/73* (2013.01); *Y10S 977/738* (2013.01); *Y10S 977/784* (2013.01)
USPC ........... 252/510; 252/511; 528/373; 528/377; 549/50; 438/758; 977/730; 977/738; 977/784

(58) Field of Classification Search
USPC .......... 252/500–518.1; 528/373, 377; 549/50; 438/758; 977/730, 738, 784
See application file for complete search history.

(56) References Cited

U.S. PATENT DOCUMENTS

| | | | | |
|---|---|---|---|---|
| 5,254,633 | A * | 10/1993 | Han et al. | 525/327.4 |
| 5,300,575 | A | 4/1994 | Jonas et al. | |
| 7,999,992 | B2 * | 8/2011 | Mazurkiewicz et al. | 359/273 |
| 2002/0045045 | A1 * | 4/2002 | Adams et al. | 428/403 |
| 2005/0034993 | A1 * | 2/2005 | Gozdz et al. | 205/57 |
| 2006/0124922 | A1 | 6/2006 | Kim et al. | |
| 2006/0199059 | A1 | 9/2006 | Xu | |
| 2007/0112101 | A1 * | 5/2007 | Choi et al. | 523/442 |
| 2007/0172834 | A1 * | 7/2007 | Englebienne et al. | 435/6 |
| 2008/0020208 | A1 * | 1/2008 | Lee et al. | 428/411.1 |
| 2008/0023676 | A1 * | 1/2008 | Hsu | 252/512 |
| 2008/0265414 | A1 | 10/2008 | Ho et al. | |
| 2010/0206613 | A1 * | 8/2010 | Rieke | 174/126.1 |
| 2011/0104072 | A1 * | 5/2011 | Bales et al. | 424/9.32 |

FOREIGN PATENT DOCUMENTS

| | | |
|---|---|---|
| WO | 98/21587 | 5/1998 |
| WO | 02/065484 A1 | 8/2002 |
| WO | WO 03/095111 | 11/2003 |
| WO | WO 03095111 | 11/2003 |
| WO | PCT/KR2010/009123 | 3/2011 |

OTHER PUBLICATIONS

Kroon et al. ("Small Bandgap Polymers for Organic Solar Cells." Polymer Reviews, 48, pp. 531-582, 2008).*

(Continued)

*Primary Examiner* — Tri V Nguyen
(74) *Attorney, Agent, or Firm* — Workman Nydegger

(57) ABSTRACT

An electrically conductive polymer linked to conductive nanoparticle is provided. The conductive polymer can include conductive monomers and one or more monomers in the conductive polymer can be linked to a conductive nanoparticle and can include a polymerizable moiety so that it can be incorporated into a polymer chain. The electrically conductive monomer can include a 3,4-ethylenedioxythiophene as a conductive monomer. The electrically conductive polymer having the conductive nanoparticle can be prepared into an electrically conductive layer or film for use in electronic devices.

18 Claims, 3 Drawing Sheets

(56) References Cited

OTHER PUBLICATIONS

Oey, C., et al., "Nanocomposite hole injection layer for organic device applications," Thin Solid Films, Dec. 1, 2005, vol. 492, Issues: 1-2, pp. 253-258.

Cai, X. et al., "Photopolymerization of Conductive Metal Nanoparticles," Photochemical & Photobiological Sciences, vol. 8(11), pp. 1568-1573.

Zhang, Z. et al., "Preparation of Polythiophene Coated Gold Nanoparticles," Materials Letters, vol. 60, 2006, pp. 1039-1042.

Zotti, G. et al., "Gold Nanoparticles Linked by Pyrrole-and Thiophene-Based Thiols, Electrochemical, Optical and Conductive Properties," Chem Mater, vol. 20, 2008, pp. 297-412.

Tanaka, M. et al., "Alternate Network Film of Thiol Group-Terminated Polythiophene and Gold Nanoparticle," Polymer, vol. 48, 2007, pp. 4884-5888.

Mathias Brust, et al "Synthesis of Thiol-derivatised Gold Nanoparticles in a Two-phase Liquid-Liquid System" J. Chem. Soc., Chem. Commun., 1994 pp. 801-802.

Andrew C. Curtis, et al "A Morphology-Selective Copper Organosol" Angew. Chem. Int. Ed. Engl. 27 (1988) No. 11 pp. 1530-1533.

A. Henglein, et al "Absorption Spectrum and Some Chemical Reactions of Colloidal Platinum in Aqueous Solution" J. Phys. Chem. 1995, 99, pp. 14129-14136.

Rene Massart "Preparation of Aqueous Magnetic Liquids in Alkaline and Acidic Media" IEEE Transactions on Magnetics, vol. MAG-17, No. 2, Mar. 1981, pp. 1247-1248.

Temer S. Ahmadi, et al "Shape-Controlled synthesis of Colloidal Platinum Nanoparticles" Science, vol. 272, Jun. 28, 1996, pp. 1924-1926.

M. A. Hayat "Colloidal Gold: Principles, Methods, and Applications vol. 1" 1989 Academic Press, Inc., San Diego California U.S. pp. 33-41 and 489-505.

\* cited by examiner

ELECTRICALLY CONDUCTIVE POLYMERS WITH ENHANCED CONDUCTIVITY

TECHNICAL FIELD

The present disclosure relates generally to polymerizable compositions and techniques for producing electrically conductive polymers with enhanced conductivity.

BACKGROUND

Electrical conductivity is an important parameter for the operation of many devices. As devices become smaller, there has been a need at improving electrical conductivity without increasing the size of the conductive entity or even a need for a reduction in size. The size of conducting members can play a role in the development and improvement of transparent electrodes, electromagnetic wave shielding films, antistatic agents, solar cells and the like.

Currently, electrical conductivity is achieved in transparent films by application of a thin metallic coating such as gold, silver or copper, or a metal oxide coating such as Indium Tin Oxide (ITO). Transparent conductive oxide films such as ITO are used in a wide variety of applications such as for window de-icers, heat reflectors, LCDs, organic light emitting diodes (OLEDs), solar cells, and architectural coatings. However, ITO coatings have many limitations such as weak mechanical strength and low flexibility, which can result in being fragile and readily damaged during bending. Also, the ITO coatings are generally applied using vacuum deposition, and are not able to form patterns or circuits. Also, the high raw material cost of indium and the chemical stability in some device structures limit potential applications. For better conductivity control and mechanical property demands (i.e., flexibility, expansion coefficient, etc), alternative highly conductive materials with more favorable mechanical properties are needed. Moreover, in consideration of the display industry pursuing light weight-, low cost- and large size-products, there is a need to develop conductive materials to improve upon and advance past ITO.

Some conductive materials that may replace ITO can include carbon nanotubes, conductive polymers, or their composite materials. Single wall carbon nanotubes (SWCNTs) are candidates for a transparent conductive film, since they are robust, giving them the potential to be deposited on plastic and flexed with no degradation in electrical conductivity. Carbon nanotube coatings may require less loading (per weight percent) than other conductive particles.

SUMMARY

Electrically conductive polymers can be prepared from monomers that are linked to an electrically conductive nanoparticle according to embodiments described herein. Such electrically conductive polymers can contain conductive monomers and monomers linked to conductive nanoparticles, and can be prepared into electrically conductive layers or films for use in electronic devices.

In one embodiment, a monomer can comprise a conductive nanoparticle and a polymerizable moiety linked to the nanoparticle. The polymerizable moiety can include an electrically conductive monomer, such as a 3,4-ethylenedioxythiophene or any other conductive monomer. Optionally, the polymerizable moiety can include a cationic monomer, anionic monomer.

In one embodiment, the polymerizable moiety can be linked to the nanoparticle through a linker. The linker can include any type of linking group, such as hydrocarbon, or any suitable linker. Some hydrocarbon examples can include alkylthio, alkenylthio, alkynylthio, or alkoxythio, which is unsubstituted or substituted.

In one embodiment, the conductive polymer can include one or more conductive monomers and a conductive nanoparticle linked to the polymer. The conductive nanoparticle can be linked to the polymer through a conductive monomer.

In one embodiment, the conductive polymer can include one or more monomers having a structure of Formula 2:

[Formula 2]

B is selected from the group of phenylene, phenylene vinylene, pyrrolylene, pyrrolylene vinylene, thienylene, thienylene vinylene, fluorenylene, fluorenylene vinylene, furanylene, furanylene vinylene, phenothiazinylene, phenothiazinylene vinylene, phenazinylene, phenazinylene vinylene, phenoxazinylene and phenoxazinylene vinylene, which is unsubstituted or substituted with one or more substituents. The substituents are independently selected from the group of hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroarylxoycarbonyl, arylalkoxycarbonyl, heteroarylalkoxycarbonyl, alkylthio, alkylthioalkyl, arylthio, arylsulfonyl and arylsulfinyl, or the substituents together may form an alkylene or alkenylene chain completing a 3, 4, 5, 6, or 7-membered aromatic or alicyclic ring having 0 or more divalent nitrogen, sulfur or oxygen atoms. These substituents can be further substituted or unsubstituted. $R_1$ is L-G, wherein G is a metal nanoparticle and L is a linker.

In one embodiment, the conductive polymer can include one or more monomers having a structure of Formula 1, where A can independently be any of the groups described in connection with B of Formula 2.

[Formula 1]

In one embodiment, the monomer can have a structure of Formula 3, Formula 4, or Formula 5, or analog or derivative thereof:

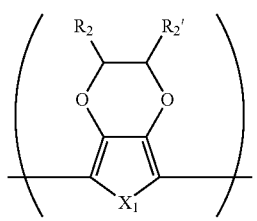

[Formula 3]

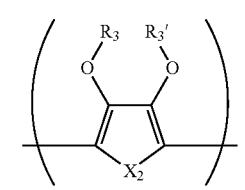

[Formula 4]

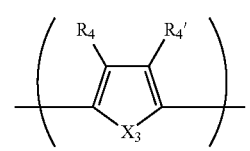

[Formula 5]

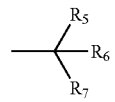

[Formula 6]

[Formula 7]

In Formulas 3-5, $X_1$, $X_2$ and $X_3$ are independently NH, O, S or PH; and $R_2$, $R_2'$, $R_3$, $R_3'$, $R_4$ and $R_4'$ are substituents, and one or more of the substituents is linked to the nanoparticle.

In one embodiment, the subtituents are independently selected from the groups: hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroarylxoycarbonyl, arylalkoxycarbonyl, heteroarylalkoxycarbonyl, alkylthio, alkylthioalkyl, arylthio, arylsulfonyl and arylsulfinyl; or $R_2$ and $R_2'$ or $R_3$ and $R_3'$ or $R_4$ and $R_4'$ together form a 3, 4, 5, 6, or 7-membered aromatic or alicyclic ring having carbons or heteroatoms of N, S, or O; which is substituted or unsubstituted.

In one embodiment, the conductive nanoparticle can be naked or include one or more solvent compatible groups. For example, the solvent compatible groups can be hydrophilic moieties.

In one embodiment, the nanoparticle can be linked to hydrophilic moieties that have Formula 6; one of $R_5$, $R_6$ and $R_7$ has Formula 7 and the others are independently hydrogen, hydroxyl, alkyl, or alkoxy; Q is an alkylene having from one or two carbons; d is 1 to 3; and $R_8$ is carboxylic acid, sulfonic acid, or a straight or branched alkyl, which is substituted with thiol.

In one embodiment, a composition can include a conductive polymer linked to a conductive nanoparticle. The conductive monomer can include a 3,4-ethylenedioxythiophene. The conductive monomer can include a structure of Formula 3, Formula 4, or Formula 5, or analog or derivative thereof as described herein.

In one embodiment, the conductive polymer can optionally be doped with one or more polymeric acids. For example, such polymeric acid can be styrenesulfonate.

In one embodiment, a composition can have a sufficient ratio of the conductive monomer and the monomer linked to the nanoparticle to conduct electricity.

In one embodiment, the composition can include a monomer having a photoreactive group. The photoreactive group can be at any of the R groups. For example, the photoreactive group can be selected from the group consisting of a cinnamoyl group, a chalcone group, a coumarin group, a maleimide group, an anthracenic group and a pyrimidine group, which is unsubstituted or substituted. A substituted group can include an ionic moiety. Also, the monomer can be in a polymerizable composition or within a polymer, which can include the monomer being a monomer of a polymer or being positioned within a polymer network.

In one embodiment, a polymer can include a conductive monomer and a monomer linked to a conductive nanoparticle. The polymer can be configured to have a sufficient ratio of the conductive monomer and the monomer linked to the nanoparticle to conduct electricity.

In an illustrative embodiment, an electronic device can include an electrically conductive polymer that has a conductive monomer and a monomer linked to a conductive nanoparticle. The conductive polymer can be an electrically conductive layer, film, or coating. Examples of electronic devices include light-emitting diodes, light emitting diode displays, liquid crystal displays, electronic paper, touchscreens, diode lasers, photodetectors, photoconductive cells, photoresistors, photoswitches, phototransistors, phototubes, IR detectors, photovoltaic devices, solar cells, transistors, diodes, memory storage devices, antistatic films biosensors, electrochromic devices, solid electrolyte capacitors, energy storage devices, electromagnetic wave shielding films, window de-icers, heat reflectors, architectural materials electro-optic modulators, microresonators, interferometers, optical switches, directional couplers and multiplexers.

In one embodiment, a kit can include a conductive monomer and a monomer linked to a conductive nanoparticle.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1A:
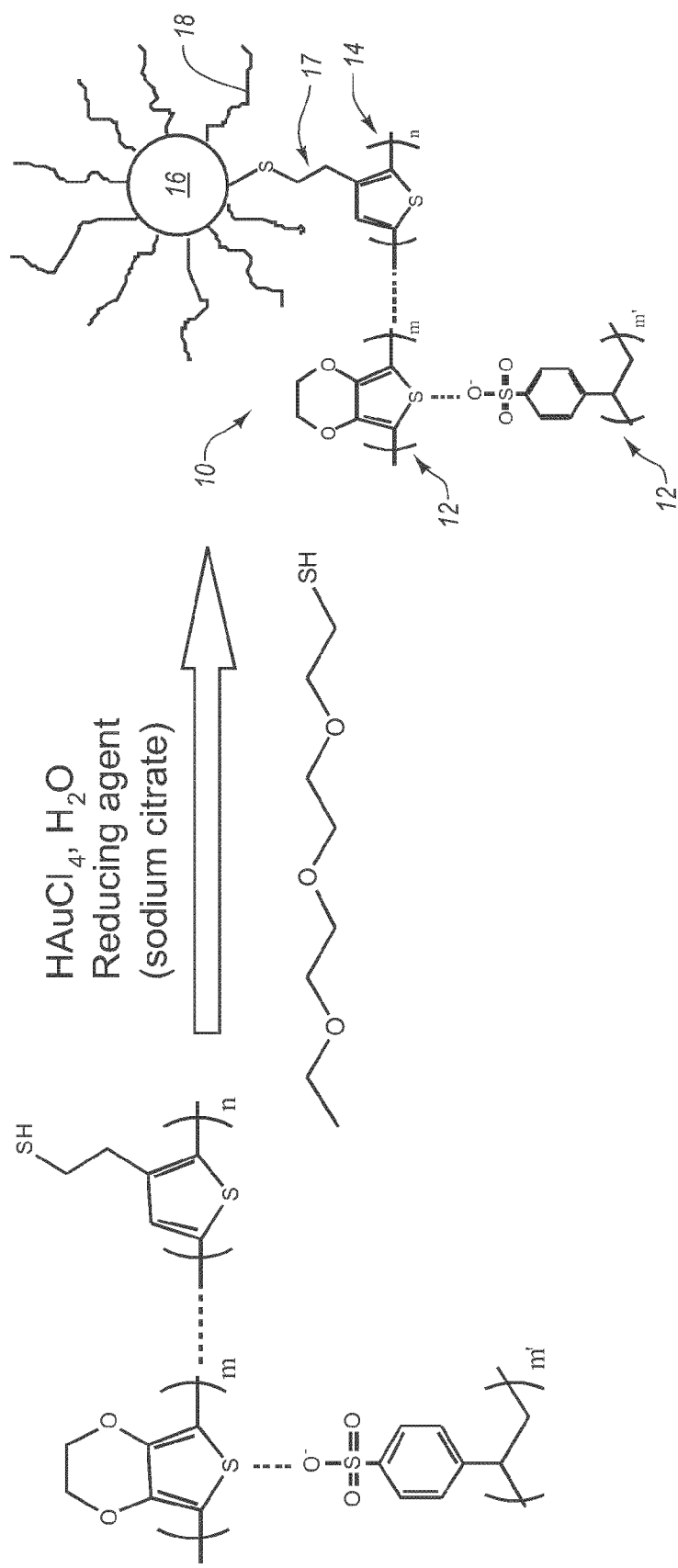
FIGS. 1A-1C illustrate methods of preparing illustrative examples of conductive polymers.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Generally, a conductive polymer composition can be prepared to include one or more electrically conducting polymers or copolymers with one or more monomers being linked to a conductive nanoparticle. The electrically conducting polymer can be prepared from one or more types of electrically conductive monomers that can pass electrical current. The polymer can include a sufficient amount of monomers being linked together such that the conductive polymer composition is capable of passing electrical current in any amount or load. A single conductive polymer chain or a polymer network composition thereof may be capable of passing an electrical current. Accordingly, the number of nanoparticles per polymer strand or polymer network can be varied as desired or needed for a particular application.

The conductive polymer can have one or more different types of electrically conductive monomers as well as a monomer linked to a conductive nanoparticle. The monomer linked to the conductive nanoparticle can include a polymerizable moiety. The conductive polymer can have the different monomers in various sequences or distributions, such as block, alternating, random, or other configuration, order or arrangement. The electrically conductive monomers can be selected based on any structural or functional application to the polymer. The different types of conductive monomers can be selected to provide for sufficient or optimal electrical conductivity, and can be included in any number, ratio, electric potential or other parameter.

In one embodiment, the electrically conductive polymer can be doped with one or more polymeric acids. The polymeric acids are doped with the conductive polymer in the form of an ionic bond. Any polymeric acids can be doped with the conductive polymer so long as the polymeric acids do not reduce the solubility of the conductive polymer. The polymeric acids can be used for providing charges on the conductive polymer to elevate electrical conductivity. Such polymeric acids includes poly(styrenesulfonate)

In one embodiment, a 3,4-ethylenedioxythiophene can be comprised in the electrically conductive polymer as an electrically conductive monomer. The electrically conductive polymer can be a poly(3,4-ethylenedioxythiophene), or can include one or more segments of poly(3,4-ethylenedioxythiophene) (PEDOT) in any number, order, arrangement, or amount, as well as 3,4-ethylenedioxythiophene monomers in any number, order, arrangement, or amount. PEDOT carries positive charges and is based on polythiophene. The poly(3,4-ethylenedioxythiophene) can include one or more 3,4-ethylenedioxythiophene monomers that are substituted or unsubstituted with R groups as described herein, wherein the substitutions can be at any hydrogen, if possible. For example, the hydrogen atoms of the ethylene group can substituted with R groups. The different substituted monomers can be arranged in any amount or order to provide desired or beneficial chemical or physical characteristics.

Additional examples of conductive polymers can include polyphenylenevinylenes, polyacetylenes, polythiophenes, polypyrroles, polyphenylene sulfides, polyalkylthiophenes, polyindoles, polypyrenes, polycarbazoles, polyazulenes, polyazepines, polynaphthalenes, and others. Accordingly, any of these conductive polymers can be linked to a conductive nanoparticle. Also, any of the monomers of these conductive polymers can be included in the conductive polymer without being linked to a conductive nanoparticle.

In one embodiment, the conductive nanoparticle can be a highly conductive particle having a high conductive density, such as but not limited to, a metal nanoparticle such as a gold nanoparticle.

In one embodiment, the conductive nanoparticle can be coupled with hydrophilic moieties. The hydrophilic moiety can be any water soluble substance, such as but not limited to a polymer like polyethylene glycol, that can be coupled with the nanoparticle to improve water compatibility. The hydrophilic moieties can be used to aid in suspending the nanoparticle within the conductive polymer or a conducting channel formed thereofrom as well as in an aqueous solvent. The hydrophilic moieties can be selected for tailoring the conductive polymer and can provide a non-uniform arrangement within the ionic polymer complex. Also, the hydrophilic moieties can increase the ability of the conductive polymer and nanoparticle to be suspended to improve use in wet fabrication techniques or water-based applications.

In one embodiment, a monomer can be linked to the conductive nanoparticle through a linker. For example, a monomer having a thiol based alkyl substituent can be coupled to the conductive nanoparticle, such as a metal nanoparticle. The methods of preparing the nanoparticle-linked monomer can use conventional preparation method of gold nanoparticle conjugation. The types and amounts of nanoparticle-linked monomers can be selected with regard to the other monomers of the conductive polymer such that the conductive polymer can have suitable solubility in water or other aqueous solvent. The selection of monomer types, amounts, or ratios can also be determined regarding the amount of hydrophilic surface molecules on the nanoparticles.

FIG. 1A illustrates a method of preparing an example of a conductive polymer 10. As shown, a random copolymer comprising 3,4-ethylenedioxythiophene and thiol-substituted alkylthiophenes as repeating units was prepared in choloroform solvent using $FeCl_3$ through an oxidative coupling reaction. To prepare metal nanoparticles surrounded by hydrophilic moieties, the method of Schiffrin (Brust et al., *J. Chem. Soc., Chem. Commun.*, 801 (1994)) was modified for preparing gold nanoparticles capped with linear alkanethiols by reducing $HAuCl_4$ using sodium citrate in the presence of a mixture of ethylene oxide substituted with thiol and the above resulting copolymer. The resultant product is a polymer 10 having a conductive monomer 12 and a monomer 14 coupled to a nanoparticle 16, where the nanoparticle 16 has from 0 to a desired number of hydrophilic moieties 18.

Alternatively, the reaction can be as follows: providing 3,4-ethylenedioxythiophene and alkylthiophene monomers; providing a nanoparticle having hydrophilic moieties as well as being linked to the alkylthiophene monomer; and polymerizing the 3,4-ethylenedioxythiophene, alkylthiophene, and nanoparticle monomers. In another alternative, the reaction can be as follows: providing 3,4-ethylenedioxythiophene and alkylthiophene monomers; providing a nanoparticle linked to a monomer; and polymerizing the 3,4-ethylenedioxythiophene, alkylthiophene, and nanoparticle monomers.

Any hydrophilic moieties can be linked to the nanoparticle before, during or after polymerization. Thus, any method that can be performed to prepare a conductive polymer having a conductive nanoparticle can be utilized, and method steps can be performed in various orders and at different times and may result in different intermediate products.

In one embodiment, the nanoparticle can be coupled to the monomer 14 through a linker 17. The linker can be an alkyl spacer that can link a monomer to a nanoparticle. For example, the linker can be coupled to the particle through a terminal thiol group, such as butanethiol, pentanethiol, hexanethiol, and heptanethiol.

For example, 3,4-ethylenedioxythiophene and a thiol-substituted alkylthiophene, can be copolymerized together by an oxidative coupling reaction. The copolymer can contain a monomer photoreactive group. Optionally, 10% or less composition of photoreactive monomer can be useful and retain electrical conductivity.

When including the alkylthiophene monomeric unit in the copolymer, the electrical conductivity can be reduced to some extent. However, the ratio and amount of monomers can be optimized for improving solubility in aqueous or polar, aprotic solvent system for being deposited as an electrically conductive layer. For example, the amount of gold can be a factor to modulate in order to control the conductivity of the resultant matrices.

Figure 1B:
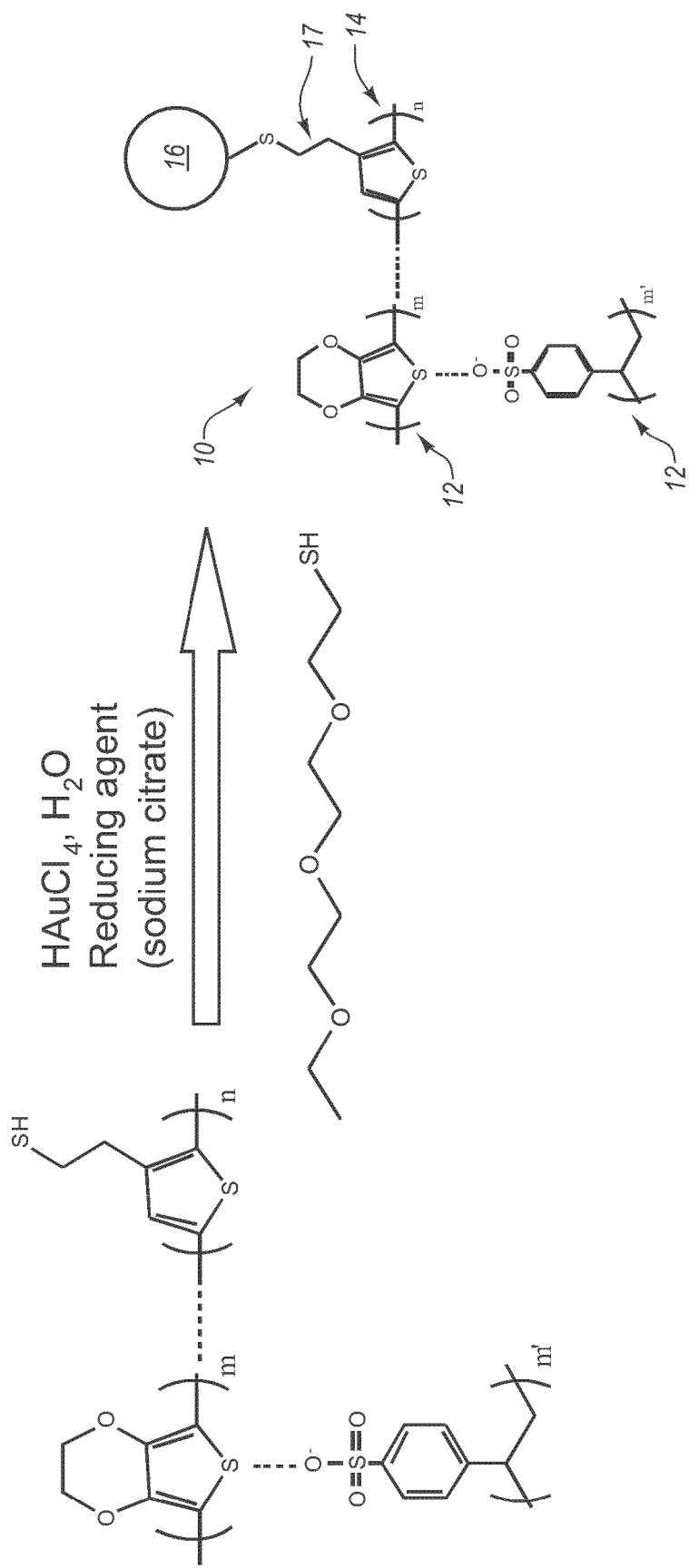

FIG. 1B shows a conductive polymer 10 where the nanoparticle 16 does not include a hydrophilic moiety.

Figure 1C:
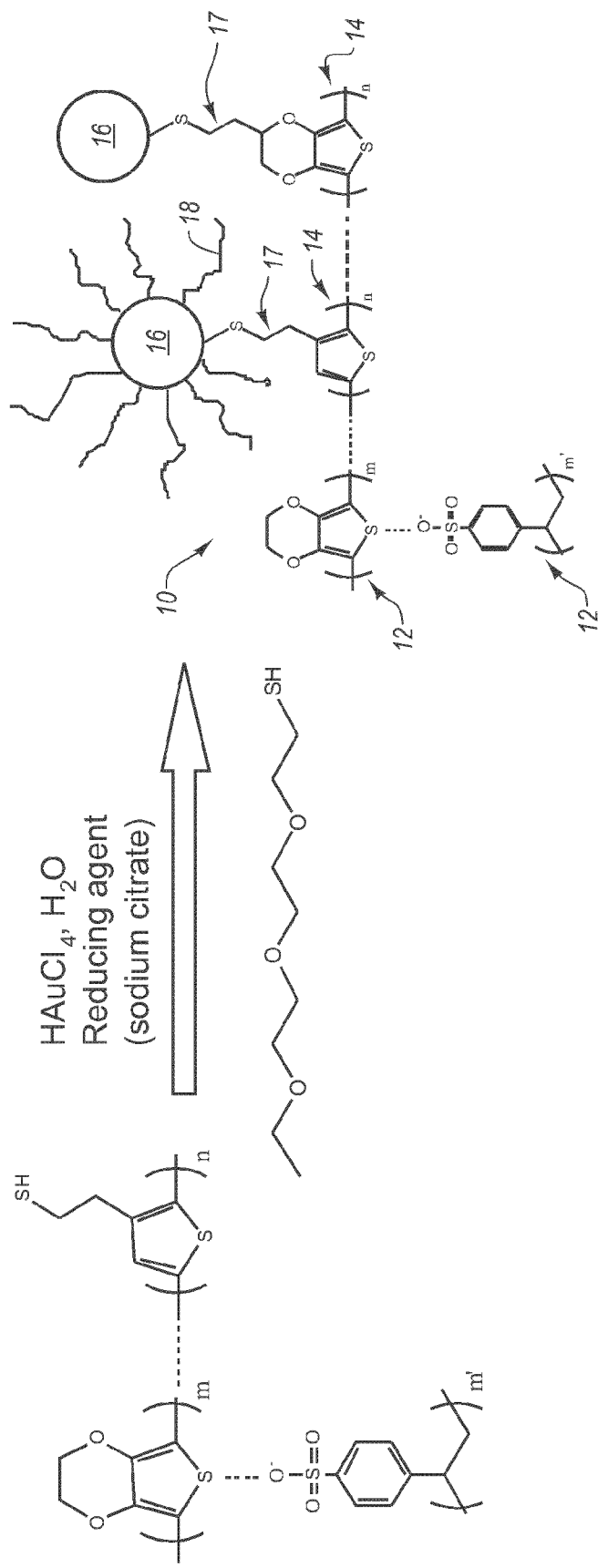

FIG. 1C shows a conductive polymer where a portion of nanoparticles ("n") have a hydrophilic moiety and a portion of the nanoparticles ("n") can be devoid of any hydrophilic moiety.

In one embodiment, the ratio of conductive monomers linked to the nanoparticle can be tuned for optimizing electrical conductivity as well as solubility in aqueous solvent or water, and each monomer can be individually selected and optimized.

In one embodiment, one of the polymers of FIGS. 1A-1C can be prepared to include hydrophobic moieties in place of the hydrophilic moieties. Also, the hydrophilic moieties can be substituted with amphiphilic, amphipathic, or amphoteric moieties. These moieties can be useful for providing solubility or the capability of being suspended in mixed solvents or organic solvents, as well as other systems.

Additionally, the monomer 14 that is coupled to the nanoparticle 16 can be a conductive monomer.

In one embodiment, the amount or ratio of monomers having a conductive nanoparticle can be modulated to increase electrical conductivity, which can include an increase in conductivity compared to a conductive polymer that is devoid of conductive nanoparticle-containing monomers.

The conductive polymer can be used for preparing a polymer product having a large area of deposition. This can be useful for preparing films, sheets, rolls, plates, coatings, circuit paths, or other conductive polymeric configuration. The conductive polymer can be prepared into a transparent conducting film or coating, and can be applied by a surface treatment or blending to prepare the conductive polymers having a conductive nanoparticle-containing monomer. For example, a wet processing technique with the conductive monomers and nanoparticle-containing monomers can be used for achieving a large coated area or large film size.

The conductive polymers can be used to prepare ordered or disordered nanostructures. The conductive polymers can also be used in applications for constructing improved transparent conducting films bearing conductive nanoparticles.

In one embodiment, an electrically conductive polymer can include at least one monomer that is linked to a conductive nanoparticle. The polymer may have other conductive monomers. For example, the electrically conductive polymer can include a combination of conductive monomers and monomers linked to conductive nanoparticles.

In one embodiment, the electrically conductive polymers can have metal nanoparticles. The metal nanoparticles can be surrounded by hydrophilic moieties. The hydrophilic moieties can be modulated in order to optimize the formation of a conducting channel, or use in tailoring a nonuniform arrangement of the ionic polymers in the ionic complex. Furthermore, the electrically conductive polymers can be dissolved in an aqueous solution such as water, alcohol and the like. The solubility property allows the electrically conductive polymers to be easily used in wet processing.

In one embodiment, an electrically conductive polymer can be a polymer having a monomer of Formula 1 and a monomer of Formula 2. The polymer can be a block copolymer with two or more monomers of Formula 1 being in a sequence and two or more monomers of Formula 2 being in a sequence. The copolymer can also include the monomers of Formulas 1 and 2 alternating in an ordered sequence or in a random distribution or any other copolymer configuration. Generally, A can be a conductive monomer and B can be a conductive monomer linked to a conductive nanoparticle.

In one embodiment, the electrically conductive polymer can include the monomers of formulas 1 and 2 as described below:

[Formula 1]

[Formula 2]

In Formulas 1 and 2, A and B can be independently selected from the group of phenylene, phenylene vinylene, pyrrolylene, pyrrolylene vinylene, thienylene, thienylene vinylene, fluorenylene, fluorenylene vinylene, furanylene, furanylene vinylene, phenothiazinylene, phenothiazinylene vinylene, phenazinylene, phenazinylene vinylene, phenoxazinylene and phenoxazinylene vinylene, which are unsubstituted or substituted with one or more substituents. The conductive polymer can include one or more B monomers having one or more R1 groups. The $R_1$ is L-G, wherein G is a conductive nanoparticle (optionally with hydrophilic moieties) and L is a linker or a bond. Also, the B monomer and/or R1 can include, a hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroarylxoycarbonyl, arylalkoxycarbonyl, heteroarylalkoxycarbonyl, alkylthio, alkylthioalkyl, arylthio, arylsulfonyl and arylsulfinyl; or the substituent may form a 3, 4, 5, 6, or 7-membered aromatic or alicyclic ring, and the ring may optionally include one or more divalent nitrogen, sulfur or oxygen atoms; and the substituents may be further substituted or unsubstituted, branched or unbranched and linear, branched or cyclic.

The conductive polymer may have a degree of polymerization of 100 to 1,000.

In the above Formulas 1 and 2, A and B are not limited to the exemplified monomers, and any monomer consisting of well-known electrically conductive polymers can be used. The monomer of Formula 1 and the monomer of Formula 2 may be easily dissolved in aqueous solvent. In one embodiment, the conductive polymer can be either undoped or doped with at least one monomer acid or a polymer acid. The monomer or polymer acid can be included in the polymer chain or within the polymer composition.

In one embodiment, the conductive nanoparticle can be incorporated into monomer B using a linker. The linker can be an alkyl or the like. The binding of the nanoparticle to monomer B can be performed using any well-known method in the art.

In one embodiment, the conductive polymer can include a monomer selected from the monomers of Formulas 3-5. Also, either Formula 1 or Formula 2 above can be one of the monomers of Formulas 3-5. The monomers of Formulas 3-5 can be as described below:

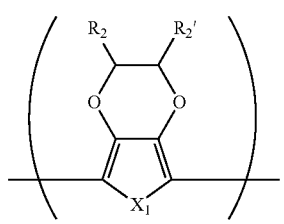

[Formula 3]

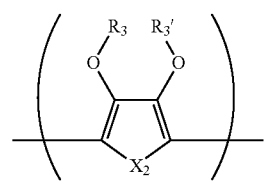

[Formula 4]

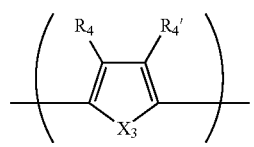

[Formula 5]

In Formulas 3-5, $X_1$, $X_2$ and $X_3$ can be independently NH, O, S or PH.

In Formulas 3-5, $R_2$ and $R_2'$, $R_3$ and $R_3'$, $R_4$ and $R_4'$ can be independently selected from the group consisting of hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroaryl- lkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl and arylsulfinyl; or, $R_2$ and $R_2'$, $R_3$ and $R_3'$, $R_4$ and $R_4'$ together may form an alkylene or alkenylene chain completing a 3, 4, 5, 6, or 7-membered aromatic or alicyclic ring, and the ring may optionally include one or more divalent nitrogen, sulfur or oxygen atoms; and the substituents may be further substituted or unsubstituted. As an example of a ring, the substitutents $R_2$ and $R_2'$, $R_3$ and $R_3'$, $R_4$ and $R_4'$ together can form a ring such as ProDOT (3,4-Propylenedioxythiophene).

In one embodiment, one or more of $R_2$, $R_2'$, $R_3$, $R_3'$, $R_4$, and $R_4'$ can be L-G, where G can be a nanoparticle, such as a metal nanoparticle with or without hydrophilic moieties. The L can be selected from the group of alkylthio, alkenylthio, alkynylthio, and alkoxythio, which is unsubstituted or substituted, branched or unbranched and linear, branched or cyclic. The alkyl portion can be as described herein. In one embodiment, G is a metal nanoparticle with hydrophilic moieties, where the hydrophilic moiety can be represented by Formula 6.

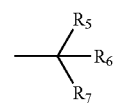

[Formula 6]

In Formula 6, $R_5$, $R_6$ and $R_7$ can be independently hydrogen, hydroxyl, alkyl, or Formula 7. In Formula 7, Q represents alkylene having one or more carbons, d is a number, and $R_8$ is carboxylic acid, sulfonic acid, or a straight or branched alkyl, which is substituted with thiol. Generally, Q can be an alkylene having one or two carbons where Formula 7 is water soluble. d can be 1 to 3.

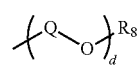

[Formula 7]

In one embodiment, at least one of $R_5$, $R_6$ and $R_7$ is Formula 7.

In one embodiment, $R_8$ may be a $C_{1-18}$ alkylthio, for example, ethylthio, propylthio, butylthio, pentylthio, hexylthio, heptylthio, octylthio, nonylthio, dodecylthio, hexadecylthio, octadecylthio, or the like.

In one embodiment, the hydrophilic moiety can be ammonium salt.

In one embodiment, conductive polymer may be doped with a polymeric acid through an ionic bond. Any polymeric acids can be doped into the conductive polymer so long as the polymeric acids do not reduce the solubility of the conductive polymer to an amount that the conductive polymer is no longer soluble or workable.

The polymeric acids can be used for providing charges on the conductive polymer to elevate electrical conductivity. Such polymeric acids includes poly(styrenesulfonate) and others.

In one embodiment, G may be a metal nanoparticle, and the metal is selected from the group consisting of gold, silver, copper and platinum, which have high conductivity. Methods of making metal nanoparticles are well-known in the art. See, e.g., Schmid, G. (ed.) *Clusters and Colloids* (VCH, Weinheim, 1994); Hayat, M. A. (ed.) *Colloidal Gold: Principles, Methods, and Applications* (Academic Press, San Diego, 1991); Massart, R., *IEEE Transactions On Magnetics,* 17, 1247 (1981); Ahmadi, T. S. et al., *Science,* 272, 1924 (1996); Henglein, A. et al., *J. Phys. Chem.,* 99, 14129 (1995); Curtis, A. C., et al., *Angew. Chem., Int. Ed. Engl.,* 27, 1530 (1988); Brust et al., *J. Chem. Soc., Chem. Commun.,* 801 (1994); PCT application WO 98/21587. Suitable nanoparticles are also commercially available from, e.g., Ted Pella, Inc., Amersham Corporation, Nanoprobes, Inc., BBI, Bangs Laboratories, etc.

In one embodiment, the conductive polymer of the present disclosure may comprise a monomer having a photoreactive group in the side chain. The photoreactive group induces a photocrosslinking reaction between the photoreactive groups in the copolymers. The kinds of photoreactive groups are not limited. Any conventional photoreactive group can be incorporated into the copolymer.

Such a photoreactive group may be selected from the group consisting of a cinnamoyl group, a chalcone group, a coumarin group, a maleimide group, an anthracenic group and a pyrimidine group, which is unsubstituted or substituted with at least one substituent having at least one ionic moiety. When the photoreactive group is substituted with at least one substituent having at least one ionic moiety, the ionic moiety can allow the electrically conductive polymer to sustain more solubility in aqueous solvent. The photoreactive group can be selected depending on hardening conditions. For example, a cinnamoyl group can be crosslinked under 254 nm UV light. Chalcone can be cured under 365 nm light at room temperature and ambient conditions. Therefore, a skilled artisan can consider the hardening condition of a conductive layer and select the proper photoreactive group to be used in the present copolymer composition.

The electrically conductive polymer in the present disclosure can be prepared by conventional methods well-known in the art. In the present disclosure, the copolymer can be prepared by copolymerizing Formulas 1 and 2, and then introducing the metal nanoparticles to B. The copolymerization can be performed, for example, through an oxidative coupling reaction, or other polymerization.

Introduction of metal nanoparticles into the polymer can be simultaneously achieved during polymerization when a monomer includes a free thiol group that can react with the nanoparticle. For example, a gold nanoparticles can be synthesized by reducing $HAuCl_4$ with a reducing agent such as sodium citrate, $H_2O_2$, $NaBH_4$, or the like. Also, hydrophillic moieties such as thiol terminated alkylene oxides can be also added to the reaction mixture to make the metal nanoparticles be surrounded by the hydrophilic moieties.

In one embodiment, the conductive polymer can have any percentage of the monomers being linked to a conductive polymer such that electrical conductance is maintained or increased. For example, from 1% to 90% of the monomers can have a conductive nanoparticle, or less than 80%, less than 70%, less than 60%, less than 50%, less than 40%, less than 30%, less than 20% or less than 10%. In another example, a composition of 10% or less of monomers having metal nanoparticles can provide electrical conductivity.

In one embodiment, the ratio of conductive monomer units and monomer units linked to a nanoparticle may be from 1:0.01 to 1:10, 1:0.5 to 1:5. Once the conductive polymer is prepared, electrical conductivity and solubility can be quickly checked after synthesis to adjust for the proper ratio of m and n. The ratio of m and n may be adjusted to optimize electrical conductivity and solubility in an aqueous or polar, aprotic solvent system. The amount of metal nanoparticles can be a factor to control the conductivity of the resultant matrices.

In one embodiment, a composition having a conductive polymer with a conductive nanoparticle, where the composition can be in various formats and configurations, such as a film or layer. To fabricate a conductive film or layer using a conductive polymer with conductive nanoparticles, the conductive polymer with conductive nanoparticles can be dispersed in a solvent to prepare a composition. Any solvent can be used for the conductive copolymer composition so long as it can substantially dissolve the conductive copolymer. Exemplary solvents useful in the present disclosure can be selected from water, alcohol, or mixtures thereof. In some instances organic solvents can be used, such as when the nanoparticle is associated with hydrophobic-containing moieties.

The composition may further include other water soluble or dispersible materials. Depending on the final application of the conductive polymer, examples of types of additional water soluble or dispersible materials which can be added include, but are not limited to, polymers, dyes, coating aids, carbon nanotubes, metal nanowires and nanoparticles, organic and inorganic conductive inks and pastes, charge transport materials, piezoelectric, pyroelectric, or ferroelectric oxide nano-particles or polymers, photoconductive oxide nanoparticles or polymers, dispersing agents, and combinations thereof. The materials can be simple molecules or polymers. Examples of other suitable water soluble or dispersible polymers include, but are not limited to, polyacrylamide, polyvinylalcohol, poly(2-vinylpridine), poly(vinylacetate), poly(vinylmethylether), poly(vinylpyrrolidone), poly(vinylbutyral), poly(styrenesulfonic acid), and conductive polymers such as polythiophenes, polyanilines, polyamines, polypyrroles, polyacetylenes, and combinations thereof.

In one embodiment, the conductive polymer having conductive nanoparticles can be formed into a conductive layer or film.

The term "layer" or "film" refers to a coating covering a desired area and may be used interchangeably. The area can be as large as an entire device or as small as a specific functional area such as the actual visual display, or even as small as a single sub-pixel. Films can be formed by any conventional deposition technique, including vapor deposition and liquid deposition. However, considering the solubility of the present conductive polymer in aqueous solution, liquid deposition can provide more convenience and enable a large patterned layer or film to be fabricated. The patterns can be formed into electronic paths. Typical liquid deposition techniques include, but are not limited to, continuous deposition techniques such as spin coating, gravure coating, curtain coating, dip coating, slot-die coating, spray coating, continuous nozzle coating, and doctor blade coating; and discontinuous deposition techniques such as ink-jet printing, gravure printing, and screen printing.

The conductive polymer can be used as an electrode or an electrode buffer layer to increase quantum efficiency. In an organic transistor, the conductive polymer can be used as an electrode material for a gate, a source-drain electrode, and the like. Further, in an electronic device, the conductive polymer compositions can be deposited to form buffer layers. The term "buffer layer" as used herein is intended to mean an electrically conductive or semiconductive layer which can be used between an anode and an active organic material. A buffer layer is believed to accomplish one or more functions in an organic electronic device, including, but not limited to, planarization of the underlying layer, hole transport, hole injection, scavenging of impurities such as oxygen and metal ions, among other aspects to facilitate or to improve the performance of an organic electronic device.

In one embodiment, an article can be prepared to include at least one electrically conductive layer formed from the conductive polymer composition. For example, organic electronic devices that may benefit from having one or more layers made from the composition include, but are not limited to, (1) devices that convert electrical energy into radiation (e. g., a light-emitting diode, light emitting diode displays, liquid crystal displays, electronic paper, touchscreens, or diode lasers), (2) devices that detect signals through electronics processes (e. g., photodetectors, photoconductive cells, photoresistors, photoswitches, phototransistors, phototubes, IR detectors), (3) devices that convert radiation into electrical energy, (e.g., a photovoltaic device or solar cell), and (4) devices that include one or more electronic components that include one or more organic semi-conductor layers (e. g., a transistor or diode). Other uses for the compositions include coating materials for memory storage devices, antistatic films, biosensors, electrochromic devices, solid electrolyte capacitors, energy storage devices such as a rechargeable battery, electromagnetic wave shielding films, window de-icers, heat reflectors, and architectural materials. As mentioned above, the conductivity of an electrically conductive layer or film can be tuned. If the layers or films have high conductivity, they can be used for OLEDs, solar cells, LCDs and the like. On the other hand, if layers or films have low conductivity, they can be used for electro-optic modulators, microresonators, interferometers, optical switches, directional couplers, multiplexers and the like.

As an example, an organic electroluminescent device can be prepared from a composition having a conducting polymer. The present disclosure will be further made clear from the following example described in detail. However, it is to be understood that the present disclosure is not limited thereto, and may be otherwise variously embodied and practiced.

The monomer can be linked to the conductive nanoparticle by a variety of chemical linkages. For example, the monomer can include a moiety that can react with the conductive nanoparticle, where such a moiety may be, but not limited to, thiol (HS), carboxy (COOH), hydroxy (OH), cyano (CN), a halogen, an alkyl substituted with a halogen, and the like. When the core is a metal or alloy material, such as gold (Au), silver (Ag), copper (Cu) or palladium (Pd), Q may be a thiol (SH) or cyano group (CN).

Those of ordinary skill in the art will appreciate that, for this and other processes and methods disclosed herein, the functions performed in the processes and methods may be implemented in differing order. Furthermore, the outlined steps and operations are provided only as examples, and some of the steps and operations may be optional, combined into fewer steps and operations, or expanded to include additional steps and operations without detracting from the essence of the present disclosure.

EXAMPLES

In order to prepare a random copolymer, thiol-substituted alkylthiophenes are prepared, and then copolymerized with 3,4-ethylenedioxythiophene in choloroform solvent using $FeCl_3$ through an oxidative coupling reaction. The resulting copolymers are dissolved in water to prepare a homogeneous solution, and polystyrene sulfonate sodium is added and reacted for about 1-3 hrs in the solution to prepare a electrically conductive polymer doped with PSS.

To prepare metal nanoparticles surrounded by hydrophilic moieties, the method of Schiffrin (Brust et al., *J. Chem. Soc., Chem. Commun.,* 801 (1994)) was modified for preparing gold nanoparticles capped with linear alkanethiols by reducing $HAuCl_4$ using sodium citrate in the presence of a mixture of ethylene oxide substituted with thiol and the above resulting copolymer, to yield copolymers having gold nanoparticles surrounded by hydrophilic ethylene oxide moieties. The resulting copolymers have enhanced electrical conductivity.

The copolymer composition is used as an electrode of a flexible display device. The flexible display device generally include an anode layer, a hole injection layer, an electroluminescent layer, a cathode layer, and a flexible organic film. A transparent plastic substrate having good manageability and waterproofness may used as the flexible organic film like polycarbonate, polyethylene terephthalate (PET) or polyethylene naphthalate (PEN).

The flexible display device can be manufactured using a typical method of preparing display devices, which are not particularly limited. First, an anode layer or cathode layer as a first electrode is formed on the plastic substrate. The first electrode layer is formed by spin coating the above copolymer composition on the plastic substrate.

The hole injection layer is formed on the first electrode. The formation of the hole injection layer reduces contact resistance of the first electrode and the electroluminescent layer and improves the electron transport ability of the first electrode to the electroluminescent layer, thereby improving the driving voltage and the lifetime of the electroluminescent device.

The hole injection layer (also referred to as the buffer layer) is formed by spin coating on the first electrode and drying it. Typical conducting polymers employed as buffer layers include polyaniline and polydioxythiophenes such as poly(3, 4-ethylenedioxythiophene) (PEDOT). These materials can be prepared by polymerizing aniline or dioxythiophene monomers in aqueous solution in the presence of a water soluble polymeric acid, such as poly(styrenesulfonic acid) (PSSA), or poly(2-acrylamido-2-methyl-1-propanesulfonic acid) ("PAAMP SA"), as described in, for example, U.S. Pat. No. 5,300,575 and published in PCT application WO 02/065484. A well known PEDOT/PSS material is Baytron®-P, commercially available from H. C. Starck, GmbH (Leverkusen, Germany).

The electroluminescent layer is formed on the hole injection layer. A material for the electroluminescent layer is not particularly limited, but examples thereof include oxadiazole dimer dyes (Bis-DAPDXP), spiro compounds (Spiro-DPVBi, Spiro-6P), triarylamine compounds, bis(styryl) amine (DPVBi, DSA), Flrpic, CzTT, Anthracene, TPB, PPCP, DST, TPA, OXD-4, BBOT, AZM-Zn, etc. which are blue materials, Coumarin 6, C545T, Quinacridone, $Ir(ppy)_3$, etc., which are green materials, and DCM1, DCM2, $Eu(thenoyltrifluoroacetone)_3(Eu(TTA)_3)$, butyl-6-(1,1,7,7-tetramethyljulolidyl-9-enyl)-4H-pyran (DCJTB), etc., which are red materials. In addition, examples of the polymer light-emitting material include polymers such as phenylene, phenylene vinylene, thiophene, fluorene, and spiro-fluorene-based polymers and aromatic compounds containing nitrogen, but are not limited thereto.

The electroluminescent layer forming composition further includes a dopant, if necessary. The amount of the dopant varies depending on the material for the electroluminescent layer, but may be generally 30-80 parts by weight based on 100 parts by weight of a material for the electroluminescent layer (total weight of the host and the dopant). When the amount of the dopant is not within this range, the luminous characteristics of an electroluminescent display device are reduced. Examples of the dopant include arylamine, perylenes, pyrroles, hydrazones, carbazoles, stilbenes, starbursts, oxadiazoles and derivatives thereof.

The hole transport layer may be optionally formed between the hole injection layer and the electroluminescent layer.

The material for the hole transport layer is not particularly limited, but may be selected from a compound having a carbazole group and/or an arylamine group, which transport electrons, a phthalocyanine-based compound, and a triphenylene derivative. More particularly, the electron transport layer (HTL) may be composed of at least one material selected from the group consisting of 1,3,5-tricarbazolylbenzene, 4,4'-biscarbazolylbiphenyl, polyvinylcarbazole, m-biscarbazolylbenzene, 4,4'-biscarbazolyl-2,2'-dimethylbiphenyl, 4,4',4''-tri(N-carbazolyl)triphenylamine, 1,3,5-tri(2-carbazolylphenyl)benzene, 1,3,5-tris(2-carbazolyl-5-methoxyphenyl)benzene, bis(4-carbazolylphenyl)silane, N,N'-bis(3-methylphenyl)-N,N'-diphenyl-[1,1-biphenyl]-4,4'-diamine (TPD), N,N'-di(naphthalene-1-yl)-N,N'-diphenyl benzidine (α-NPD), N,N'-diphenyl-N,N'-bis(1-naphthyl)-(1,1'-biphenyl)-4,4'-diamine (NPB), IDE320 (Idemitsu Kosan Co., LTD.), poly(9,9-dioctylfluorene-co-N-(4-butylphenyl) diphenylamine (TFB), and poly(9,9-dioctylfluorene-co-bis-N,N-phenyl-1,4-phenylenediamine) (PFB), but are not limited thereto. The hole blocking layer may be composed of 2 phenanthrolines (e.g., BCP available from UDC), imidazoles, triazoles, oxadiazoles (e.g., PBD), aluminium complex (available from UDC), or BAlq and the like.

Then, the second electrode is formed on the resultant and sealed to complete an organic electroluminescent device. The material for the second electrode is not particularly limited, but may be a metal having a low work function, i.e., Li, Cs, Ba, Ca, Ca/Al, LiF/Ca, LiF/Al, $BaF_2$/Ca, Mg, Ag, Al, or an alloy thereof, or a multilayer thereof.

The organic electroluminescent device of the present disclosure does not require a particular apparatus or method for manufacturing it, and can be manufactured using a conventional manufacturing method.

The present disclosure is not to be limited in terms of the particular examples described in this disclosure. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds, or compositions, which can, of course, vary. It is also to be understood that the terminology used herein is for the purpose of describing particular examples only, and is not intended to be limiting.

Unless otherwise indicated, this disclosure uses the definitions provided below. Some of the definitions and formulae may include a dash ("-") to indicate a bond between atoms or a point of attachment to a named or unnamed atom or group of atoms. Other definitions and formulae may include an equal sign ("=") or an identity symbol ("≡") to indicate a double bond or a triple bond, respectively.

"Substituted" groups are those in which one or more hydrogen atoms have been replaced with one or more non-hydrogen groups, provided that valence requirements are met and that a chemically stable compound results from the substitution.

"Alkyl" refers to straight chain and branched saturated hydrocarbon groups, generally having a specified number of carbon atoms (i. e., $C_{1-6}$ alkyl refers to an alkyl group having 1, 2, 3, 4, 5, or 6 carbon atoms and $C_{1-12}$ alkyl refers to an alkyl group having 1, 2, 3, 4, 5, 6, 7, 8, 9, 10, 11, or 12 carbon atoms). Examples of alkyl groups include, without limitation, methyl, ethyl, n-propyl, i-propyl, n-butyl, s-butyl, i-butyl, t-butyl, pent-1-yl, pent-2-yl, pent-3-yl, 3-methylbut-1-yl, 3-methylbut-2-yl, 2-methylbut-2-yl, 2,2,2-trimethyleth-1-yl, n-hexyl, and the like. Alkyls can also be cyclic.

The terms aliphatic or alkyl also encompasses alkenyl groups, such as vinyl, allyl, aralkyl and alkynyl groups.

Substitutions within an alkyl or aliphatic group can include any atom or group that can be tolerated in the aliphatic moiety, including but not limited to halogens, sulfurs, thiols, thioethers, thioesters, amines (primary, secondary, or tertiary), amides, ethers, esters, alcohols, oxygen, and the like. The aliphatic groups can by way of example also include modifications such as azo groups, keto groups, aldehyde groups, carbonyl groups, carboxyl groups, nitro, nitroso or nitrile groups, heterocycles such as imidazole, hydrazino or hydroxylamino groups, isocyanate or cyanate groups, and sulfur containing groups such as sulfoxide, sulfone, sulfide, and disulfide. Additionally, the substitutions can be via single, double, or triple bonds, when relevant or possible.

Further, alkyl groups may also contain hetero substitutions, which are substitutions of carbon atoms, by hetero atoms such as, for example, nitrogen, oxygen, phosphorous, or sulfur. As such, a linker comprised of a substituted aliphatic can have a backbone comprised of carbon, nitrogen, oxygen, sulfur, phosphorous, and/or the like. Heterocyclic substitutions refer to alkyl rings having one or more hetero atoms. Examples of heterocyclic moieties include but are not limited to morpholino, imidazole, tetrahydrofuran, and pyrrolidino.

"Alkylene" refers to a linear or branched saturated divalent hydrocarbon radical. Examples of the alkylene group include, without limitation, methylene, ethylene, propylene, butylenes, and the like.

"Heteroalkylene" refers to an alkylene chain as described above, in which one or more C-atoms have in each case been replaced by a heteroatom mutually independently selected from the group comprising oxygen, sulfur and nitrogen (NH). Heteroalkylene groups can have 1, 2 or 3 heteroatom(s), particularly one heteroatom, selected from the group comprising oxygen, sulfur and nitrogen (NH) as the chain member(s). Heteroalkylene groups can be 2- to 20 membered or 2- to 12-membered, particularly 2- to 6-membered, and more particularly 2- or 3-membered. Any alkylene can be a heteroalkylene.

"Alkenyl" refers to straight chain and branched hydrocarbon groups having one or more unsaturated carbon-carbon bonds, and generally having a specified number of carbon atoms. Examples of alkenyl groups include, without limitation, ethenyl, 1-propen-1-yl, 1-propen-2-yl, 2-propen-1-yl, 1-buten-1-yl, 1-buten-2-yl, 3-buten-1-yl, 3-buten-2-yl, 2-buten-1-yl, 2-buten-2-yl, 2-methyl-1-propen-1-yl, 2-methyl-2-propen-1-yl, 1,3-butadien-1-yl, 1,3-butadien-2-yl, and the like.

"Alkynyl" refers to straight chain or branched hydrocarbon groups having one or more triple carbon-carbon bonds, and generally having a specified number of carbon atoms.

Examples of alkynyl groups include, without limitation, ethynyl, 1-propyn-1-yl, 2-propyn-1-yl, 1-butyn-1-yl, 3-butyn-1-yl, 3-butyn-2-yl, 2-butyn-1-yl, and the like.

"Alkanoyl" and "alkanoylamino" refer, respectively, to alkyl-C(O)— and alkyl-C(O)—NH—, where alkyl is defined above, and generally includes a specified number of carbon atoms, including the carbonyl carbon. Examples of alkanoyl groups include, without limitation, formyl, acetyl, propionyl, butyryl, pentanoyl, hexanoyl, and the like.

"Alkenoyl" and "alkynoyl" refer, respectively, to alkenyl-C(O)— and alkynyl-C(O)—, where alkenyl and alkynyl are defined above. References to alkenoyl and alkynoyl generally include a specified number of carbon atoms, excluding the carbonyl carbon. Examples of alkenoyl groups include, without limitation, propenoyl, 2-methylpropenoyl, 2-butenoyl, 3-butenoyl, 2-methyl-2-butenoyl, 2-methyl-3-butenoyl, 3-methyl-3-butenoyl, 2-pentenoyl, 3-pentenoyl, 4-pentenoyl, and the like. Examples of alkynoyl groups include, without limitation, propynoyl, 2-butynoyl, 3-butynoyl, 2-pentynoyl, 3-pentynoyl, 4-pentynoyl, and the like.

"Alkoxy," "alkoxycarbonyl," and "alkoxycarbonylamino," refer, respectively, to alkyl-O—, alkenyl-O, and alkynyl-O; to alkyl-O—C(O)—, alkynyl-O—C(O)—; and to alkyl-O—C(O)—NH—, and alkynyl-O—C(O)—NH—, where alkyl, alkenyl, and alkynyl are defined above. Examples of alkoxy groups include, without limitation, methoxy, ethoxy, n-propoxy, i-propoxy, n-butoxy, s-butoxy, t-butoxy, n-pentoxy, s-pentoxy, and the like. Examples of alkoxycarbonyl groups include, without limitation, methoxycarbonyl, ethoxycarbonyl, n-propoxycarbonyl, i-propoxycarbonyl, n-butoxycarbonyl, s-butoxycarbonyl, t-butoxycarbonyl, n-pentoxycarbonyl, s-pentoxycarbonyl, and the like.

"Alkylamino," "alkylaminocarbonyl," "dialkylaminocarbonyl," "alkylsulfonyl," "alkylsulfinyl," "sulfonylaminoalkyl," and "alkylsulfonylaminocarbonyl" refer, respectively, to alkyl-NH—, alkyl-NH—C(O)—, alkyl$_2$-N—C(O)—, alkyl-S(O$_2$)—, alkyl-S(=O)—, HS(O$_2$)—NH-alkyl-, and alkyl-S(O)—NH—C(O)—, where alkyl is defined above.

"Aminoalkyl" and "cyanoalkyl" refer, respectively, to NH$_2$-alkyl and N=C-alkyl, where alkyl is defined above.

"Halo," "halogen" and "halogeno" may be used interchangeably, and refer to fluoro, chloro, bromo, and iodo.

"Haloalkyl," "haloalkenyl," "haloalkynyl," "haloalkanoyl," "haloalkenoyl," "haloalkynoyl," "haloalkoxy," and "haloalkoxycarbonyl" refer, respectively, to alkyl, alkenyl, alkynyl, alkanoyl, alkenoyl, alkynoyl, alkoxy, and alkoxycarbonyl groups substituted with one or more halogen atoms, where alkyl, alkenyl, alkynyl, alkanoyl, alkenoyl, alkynoyl, alkoxy, and alkoxycarbonyl are defined above. Examples of haloalkyl groups include, without limitation, trifluoromethyl, trichloromethyl, pentafluoroethyl, pentachloroethyl, and the like.

"Hydroxyalkyl" and "oxoalkyl" refer, respectively, to HO-alkyl and O=alkyl, where alkyl is defined above. Examples of hydroxyalkyl and oxoalkyl groups include, without limitation, hydroxymethyl, hydroxyethyl, 3-hydroxypropyl, oxomethyl, oxoethyl, 3-oxopropyl, and the like.

"Cycloalkyl" refers to saturated monocyclic and bicyclic hydrocarbon rings, generally having a specified number of carbon atoms that comprise the ring (i.e., C3-7 cycloalkyl refers to a cycloalkyl group having 3, 4, 5, 6 or 7 carbon atoms as ring members). The cycloalkyl may be attached to a parent group or to a substituent at any ring atom, unless such attachment would violate valence requirements. Likewise, the cycloalkyl groups may include one or more non-hydrogen substituents unless such substitution would violate valence requirements.

Examples of monocyclic cycloalkyl groups include, without limitation, cyclopropyl, cyclobutyl, cyclopentyl, cyclohexyl, and the like. Examples of bicyclic cycloalkyl groups include, without limitation, bicyclo[1.1.0]butyl, bicyclo[1.1.1]pentyl, bicyclo[2.1.0]pentyl, bicyclo[2.1.1]hexyl, bicyclo[3.1.0]hexyl, bicyclo[2.2.1]heptyl, bicyclo[3.2.0]heptyl, bicyclo[3.1.1]heptyl, bicyclo[4.1.0]heptyl, bicyclo[2.2.2]octyl, bicyclo[3.2.1]octyl, bicyclo[4.1.1]octyl, bicyclo[3.3.0]octyl, bicyclo[4.2.0]octyl, bicyclo[3.3.1]nonyl, bicyclo[4.2.1]nonyl, bicyclo[4.3.0]nonyl, bicyclo[3.3.2]decyl, bicyclo[4.2.2]decyl, bicyclo[4.3.1]decyl, bicyclo[4.4.0]decyl, bicyclo[3.3.3]undecyl, bicyclo[4.3.2]undecyl, bicyclo[4.3.3]dodecyl, and the like, which may be attached to a parent group or a substituent at any of the ring atoms, unless such attachment would violate valence requirements.

"Cycloalkenyl" refers to monocyclic and bicyclic hydrocarbon rings having one or more unsaturated carbon-carbon bonds and generally having a specified number of carbon atoms that comprise the ring (i.e., C3-7 cycloalkenyl refers to a cycloalkenyl group having 3, 4, 5, 6 or 7 carbon atoms as ring members). The cycloalkenyl may be attached to a parent group or to a subsituent at any ring atom, unless such attachment would violate valence requirements.

Likewise, the cycloalkenyl groups may include one or more non-hydrogen substituents unless such substitution would violate valence requirements. Useful substituents include, without limitation, alkyl, alkenyl, alkynyl, haloalkyl, haloalkenyl, haloalkynyl, alkoxy, alkoxycarbonyl, alkanoyl, and halo, as defined above, and hydroxy, mercapto, nitro, and amino.

"Cycloalkanoyl" and "cycloalkenoyl" refer to cycloalkyl-C(O)— and cycloalkenyl-C(O)—, respectively, where cycloalkyl and cycloalkenyl are defined above. References to cycloalkanoyl and cycloalkenoyl generally include a specified number of carbon atoms, excluding the carbonyl carbon. Examples of cycloalkanoyl groups include, without limitation, cyclopropanoyl, cyclobutanoyl, cyclopentanoyl, cyclohexanoyl, cycloheptanoyl, 1-cyclobutenoyl, 2-cyclobutenoyl, 1-cyclopentenoyl, 2-cyclopentenoyl, 3-cyclopentenoyl, 1-cyclohexenoyl, 2-cyclohexenoyl, 3-cyclohexenoyl, and the like.

"Cycloalkoxy" and "cycloalkoxycarbonyl" refer, respectively, to cycloalkyl-O— and cycloalkenyl-O, and to cycloalkyl-O—C(O)— and cycloalkenyl-O—C(O)—, where cycloalkyl and cycloalkenyl are defined above. References to cycloalkoxy and cycloalkoxycarbonyl generally include a specified number of carbon atoms, excluding the carbonyl carbon.

Examples of cycloalkoxy groups include, without limitation, cyclopropoxy, cyclobutoxy, cyclopentoxy, cyclohexoxy, 1-cyclobutenoxy, 2-cyclobutenoxy, 1-cyclopentenoxy, 2-cyclopentenoxy, 3-cyclopentenoxy, 1-cyclohexenoxy, 2-cyclohexenoxy, 3-cyclohexenoxy, and the like. Examples of cycloalkoxycarbonyl groups include, without limitation, cyclopropoxycarbonyl, cyclobutoxycarbonyl, cyclopentoxycarbonyl, cyclohexoxycarbonyl, 1-cyclobutenoxycarbonyl, 2-cyclobutenoxycarbonyl, 1-cyclopentenoxycarbonyl, 2-cyclopentenoxycarbonyl, 3-cyclopentenoxycarbonyl, 1-cyclohexenoxycarbonyl, 2-cyclohexenoxycarbonyl, 3-cyclohexenoxycarbonyl, and the like.

"Aryl" and "arylene" refer to monovalent and divalent aromatic groups, respectively, including 5- and 6-membered monocyclic aromatic groups that contain 0 to 4 heteroatoms independently selected from nitrogen, oxygen, and sulfur. Examples of monocyclic aryl groups include, without limitation, phenyl, pyrrolyl, furanyl, thiopheneyl, thiazolyl, isothiazolyl, imidazolyl, triazolyl, tetrazolyl, pyrazolyl, oxazolyl, isooxazolyl, pyridinyl, pyrazinyl, pyridazinyl, pyrimidinyl, and the like. Aryl and arylene groups also include bicyclic groups, tricyclic groups, etc., including fused 5- and 6-membered rings as described above. Examples of multicyclic aryl groups include, without limitation, naphthyl, biphenyl, anthracenyl, pyrenyl, carbazolyl, benzoxazolyl, benzodioxazolyl, benzothiazolyl, benzoimidazolyl, benzothiopheneyl, quinolinyl, isoquinolinyl, indolyl, benzofuranyl, purinyl, indolizinyl, and the like. The aryl and arylene groups may be attached to a parent group or to a substituent at any ring atom, unless such attachment would violate valence requirements.

Likewise, aryl and arylene groups may include one or more non-hydrogen substituents unless such substitution would violate valence requirements. Useful substituents include, without limitation, alkyl, alkenyl, alkynyl, haloalkyl, haloalkenyl, haloalkynyl, cycloalkyl, cycloalkenyl, alkoxy, cycloalkoxy, alkanoyl, cycloalkanoyl, cycloalkenoyl, alkoxycarbonyl, cycloalkoxycarbonyl, and halo, as defined above, and hydroxy, mercapto, nitro, amino, and alkylamino.

"Heterocycle" and "heterocyclyl" refer to saturated, partially unsaturated, or unsaturated monocyclic or bicyclic rings having from 5 to 7 or from 7 to 11 ring members, respectively. These groups have ring members made up of carbon atoms and from 1 to 4 heteroatoms that are independently nitrogen, oxygen or sulfur, and may include any bicyclic group in which any of the above-defined monocyclic heterocycles are fused to a benzene ring. The nitrogen and sulfur heteroatoms may optionally be oxidized. The heterocyclic ring may be attached to a parent group or to a substituent at any heteroatom or carbon atom unless such attachment would violate valence requirements. Likewise, any of the carbon or nitrogen ring members may include a non-hydrogen substituent unless such substitution would violate valence requirements. Useful substituents include, without limitation, alkyl, alkenyl, alkynyl, haloalkyl, haloalkenyl, haloalkynyl, cycloalkyl, cycloalkenyl, alkoxy, cycloalkoxy, alkanoyl, cycloalkanoyl, cycloalkenoyl, alkoxycarbonyl, cycloalkoxycarbonyl, and halo, as defined above, and hydroxy, mercapto, nitro, amino, and alkylamino.

Examples of heterocycles include, without limitation, acridinyl, azocinyl, benzimidazolyl, benzofuranyl, benzothiofuranyl, benzothiophenyl, benzoxazolyl, benzthiazolyl, benztriazolyl, benztetrazolyl, benzisoxazolyl, benzisothiazolyl, benzimidazolinyl, carbazolyl, 4aH-carbazolyl, carbolinyl, chromanyl, chromenyl, cinnolinyl, decahydroquinolinyl, 2H, 6H-1,5,2-dithiazinyl, dihydrofuro[2,3-b]tetrahydrofuran, furanyl, furazanyl, imidazolidinyl, imidazolinyl, imidazolyl, 1H-indazolyl, indolenyl, indolinyl, indolizinyl, indolyl, 3H-indolyl, isobenzofuranyl, isochromanyl, isoindazolyl, isoindolinyl, isoindolyl, isoquinolinyl, isothiazolyl, isoxazolyl, morpholinyl, naphthyridinyl, octahydroisoquinolinyl, oxadiazolyl, 1,2,3-oxadiazolyl, 1,2,4-oxadiazolyl, 1,2,5-oxadiazolyl, 1,3,4-oxadiazolyl, oxazolidinyl, oxazolyl, oxazolidinyl, pyrimidinyl, phenanthridinyl, phenanthrolinyl, phenazinyl, phenothiazinyl, phenoxathiinyl, phenoxazinyl, phthalazinyl, piperazinyl, piperidinyl, pteridinyl, purinyl, pyranyl, pyrazinyl, pyrazolidinyl, pyrazolinyl, pyrazolyl, pyridazinyl, pyridooxazole, pyridoimidazole, pyridothiazole, pyridinyl, pyridyl, pyrimidinyl, pyrrolidinyl, pyrrolinyl, 2H-pyrrolyl, pyrrolyl, quinazolinyl, quinolinyl, 4H-quinolizinyl, quinoxalinyl, quinuclidinyl, tetrahydrofuranyl, tetrahydroisoquinolinyl, tetrahydroquinolinyl, 6H-1,2,5-thiadiazinyl, 1,2,3-thiadiazolyl, 1,2,4-thiadiazolyl, 1,2,5-thiadiazolyl, 1,3,4-thiadiazolyl, thianthrenyl, thiazolyl, thienyl, thienothiazolyl, thienooxazolyl, thienoimidazolyl, thiophenyl, triazinyl, 1,2,3-triazolyl, 1,2,4-triazolyl, 1,2,5-triazolyl, 1,3,4-triazolyl, and xanthenyl.

"Heteroaryl" and "heteroarylene" refer, respectively, to monovalent and divalent heterocycles or heterocyclyl groups, as defined above, which are aromatic. Heteroaryl and heteroarylene groups represent a subset of aryl and arylene groups, respectively.

"Arylalkyl" and "heteroarylalkyl" refer, respectively, to aryl-alkyl and heteroaryl-alkyl, where aryl, heteroaryl, and alkyl are defined above. Examples include, without limitation, benzyl, fluorenylmethyl, imidazol-2-yl-methyl, and the like.

"Arylalkanoyl," "heteroarylalkanoyl," "arylalkenoyl," "heteroarylalkenoyl," "arylalkynoyl," and "heteroarylalkynoyl" refer, respectively, to aryl-alkanoyl, heteroaryl-alkanoyl, aryl-alkenoyl, heteroaryl-alkenoyl, aryl-alkynoyl, and heteroaryl-alkynoyl, where aryl, heteroaryl, alkanoyl, alkenoyl, and alkynoyl are defined above. Examples include, without limitation, benzoyl, benzylcarbonyl, fluorenoyl, fluorenylmethylcarbonyl, imidazol-2-oyl, imidazol-2-yl-methylcarbonyl, phenylethenecarbonyl, 1-phenylethenecarbonyl, 1-phenyl-propenecarbonyl, 2-phenyl-propenecarbonyl, 3-phenyl-propenecarbonyl, imidazol-2-yl-ethenecarbonyl, 1-(imidazol-2-yl)-ethenecarbonyl, 1-(imidazol-2-yl)-propenecarbonyl, 2-(imidazol-2-yl)-propenecarbonyl, 3-(imidazol-2-yl)-propenecarbonyl, phenylethynecarbonyl, phenylpropynecarbonyl, (imidazol-2-yl)-ethynecarbonyl, (imidazol-2-yl)-propynecarbonyl, and the like.

"Arylalkoxy" and "heteroarylalkoxy" refer, respectively, to aryl-alkoxy and heteroaryl-alkoxy, where aryl, heteroaryl, and alkoxy are defined above. Examples include, without limitation, benzyloxy, fluorenylmethyloxy, imidazol-2-yl-methyloxy, and the like.

"Aryloxy" and "heteroaryloxy" refer, respectively, to aryl-O— and heteroaryl-O—, where aryl and heteroaryl are defined above. Examples include, without limitation, phenoxy, imidazol-2-yloxy, and the like.

"Aryloxycarbonyl," "heteroaryloxycarbonyl," "arylalkoxycarbonyl," and "heteroarylalkoxycarbonyl" refer, respectively, to aryloxy-C(O)—, arylalkoxy-C(O)—, heteroarylalkoxy-C(O)—, where aryloxy, heteroaryloxy, arylalkoxy, and heteroarylalkoxy are defined above. Examples include, without limitation, phenoxycarbonyl, imidazol-2-yloxycarbonyl, benzyloxycarbonyl, fluorenylmethyloxycarbonyl, imidazol-2-yl-methyloxycarbonyl, and the like.

"alkylthio," "alkenylthio," "alkynylthio," "alkoxythio," "alkylthioalkyl," and "arylthio," refer, respectively, to —S-alkyl, —S-alkenyl, —S-alkynyl, —S-alkoxy, alkyl substituted with alkylthio, and —S-aryl, where alyl and aryl are defined above.

"Arylsulfonyl" and "arylsulfinyl" refer, respectively, to aryl-S(O$_2$)— and aryl-S(=O)—, where aryl is defined above.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth."

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. All references recited herein are incorporated herein by specific reference in their entirety.

The invention claimed is:

1. A polymer and nanoparticle combination comprising:
a conductive copolymer having one or more first conductive monomers and one or more second conductive monomers, wherein the one or more first conductive monomers and the one or more second conductive monomers are copolymerized to form the conductive copolymer; a conductive nanoparticle covalently bound to a first end of a linker and a second end of the linker being covalently bound to the conductive copolymer, the linker including at least one member selected from the group consisting of an alkylthio, an alkenylthio, and an alkynylthio;
wherein the one or more first conductive monomers have a structure Formula 4 or an analog or derivative thereof:

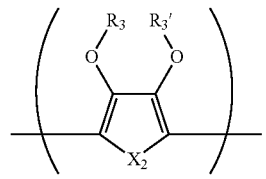

[Formula 4]

where:
X$_2$ is S; and
R$_3$ and R$_3$' are substituents and represent 3,4-propylenedioxythiophene; and
wherein the one or more second conductive monomers have a structure of Formula 1:

[Formula 1]

—(A)— where:
A is thienylene vinylene, which is unsubstituted or substituted with one or more substituents,
wherein the substituents are independently selected from the group of hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl and arylsulfinyl, or the substituents together may form an alkylene or alkenylene chain completing a 3, 4, 5, 6, or 7-membered aromatic or alicyclic ring having 0 or more divalent nitrogen, sulfur or oxygen atoms; and the substituents being substituted or unsubstituted.

2. The polymer and nanoparticle combination of claim 1, wherein the conductive nanoparticle is linked to one or more of the first conductive monomers, and/or one or more of the second conductive monomers.

3. The polymer and nanoparticle combination of claim 1, wherein the polymer has a degree of polymerization in a range from 100 to 1,000.

4. The polymer and nanoparticle combination as in claim 1, wherein the conductive nanoparticle has one or more solvent compatible groups.

5. The polymer and nanoparticle combination as in claim 4, wherein the solvent compatible groups are hydrophilic moieties.

6. The polymer and nanoparticle combination of claim 1, wherein the linker is unsubstituted or substituted.

7. The polymer and nanoparticle combination of claim 1, wherein the conductive polymer includes one or more cationic or anionic monomers.

8. The polymer and nanoparticle combination of claim 1, comprising one or more styrene sulfonate monomers.

9. A polymer and nanoparticle combination comprising:
the polymer having one or more first conductive monomers and one or more second conductive monomers that are copolymerized to form the copolymer;
wherein the one or more first conductive monomers have a structure of Formula 4 or an analog or derivative thereof:

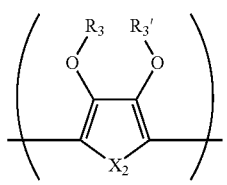

[Formula 4]

where:
$X_2$ is S; and
$R_3$ and $R_3'$ are substituents and represent 3,4-propylenedioxythiophene; and
a conductive nanoparticle linked to the one or more conductive monomers through the $R_3$, or $R_3'$ substituent, the one or more conductive monomers covalently bound to a first end of a linker and a second end of the linker being covalently bound to the conductive nanoparticle, the linker including at least one member selected from the group consisting of an alkylthio, an alkenylthio, and an alkynylthio;
the one or more second conductive monomers have a structure of Formula 1:

[Formula 1]

where:
A is thienylene vinylene, which is unsubstituted or substituted with one or more substituents, wherein the substituents are independently selected from the group of hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl and arylsulfinyl, or the substituents together may form an alkylene or alkenylene chain completing a 3, 4, 5, 6, or 7-membered aromatic or alicyclic ring having 0 or more divalent nitrogen, sulfur or oxygen atoms; and the substituents being substituted or unsubstituted.

10. The polymer and nanoparticle combination of claim 9, wherein the polymer has a degree of polymerization in a range from 100 to 1,000.

11. An electronic device comprising the polymer and nanoparticle combination of claim 9.

12. The polymer and nanoparticle combination of claim 9, wherein the linker is unsubstituted or substituted.

13. The polymer and nanoparticle combination of claim 9, wherein the polymer includes one or more cationic or anionic monomers.

14. The polymer and nanoparticle combination of claim 9, wherein the polymer includes one or more styrene sulfonate monomers.

15. A composition comprising the polymer and nanoparticle combination of claim 1 and a polymeric acid doped into the polymer.

16. An electronic device comprising the polymer and nanoparticle combination of claim 1.

17. A polymer and nanoparticle combination comprising:
a conductive copolymer having one or more first conductive monomers and one or more second monomers, wherein the one or more first conductive monomers and the one or more second monomers are copolymerized to form the conductive copolymer; a conductive nanoparticle covalently bound to a first end of a linker and a second end of the linker being covalently bound to the conductive copolymer, so that the nanoparticle is indirectly linked to the conductive polymer through the linker, the linker including at least one member selected from the group consisting of an alkylthio, an alkenylthio, and an alkynylthio;
wherein the conductive nanoparticle is selected from the group consisting of gold, silver, copper, platinum, and palladium;
wherein the one or more first conductive monomers have a structure of Formula 4 or an analog or derivative thereof:

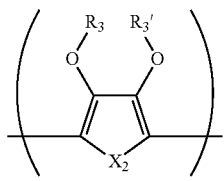

[Formula 4]

where:

X$_2$ is S; and

R$_3$ and R$_3$' are substituents and represent 3,4-propylenedioxythiophene; and wherein the one or more second monomers have a structure of Formula 1:

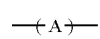

[Formula 1]

where:

A is thienylene vinylene, which is unsubstituted or substituted with one or more substituents, wherein the substituents are independently selected from the group of hydrogen, hydroxyl, alkyl, alkenyl, alkynyl, alkanoyl, alkanoylamino, alkenoyl, alkynoyl, alkoxy, alkoxycarbonyl, alkoxycarbonylamino, alkylamino, alkylaminocarbonyl, dialkylaminocarbonyl, alkylsulfonyl, alkylsulfinyl, sulfonylaminoalkyl, alkylsulfonylaminocarbonyl, aminoalkyl, cyanoalkyl, halogen, haloalkyl, haloalkenyl, haloalkynyl, haloalkanoyl, haloalkenoyl, haloalkynoyl, haloalkoxy, haloalkoxycarbonyl, hydroxyalkyl, oxoalkyl, cycloalkyl, cycloalkenyl, cycloalkanoyl, cycloalkenoyl, cycloalkoxy, cycloalkoxycarbonyl, aryl, arylene, heterocycle, heterocyclyl, heteroaryl, heteroarylene, arylalkyl, heteroarylalkyl, arylalkanoyl, heteroarylalkanoyl, arylalkenoyl, heteroarylalkenoyl, arylalkynoyl, heteroarylalkynoyl, arylalkoxy, heteroarylalkoxy, aryloxy, heteroaryloxy, aryloxycarbonyl, heteroaryloxycarbonyl, arylalkoxycarbonyl, heteroarylalkoxycarbonyl, alkylthio, alkylthioalkyl, arylthio, arylsulfonyl and arylsulfinyl, or the substituents together may form an alkylene or alkenylene chain completing a 3, 4, 5, 6, or 7-membered aromatic or alicyclic ring having 0 or more divalent nitrogen, sulfur or oxygen atoms; and the substituents being substituted or unsubstituted.

18. A composition comprising the polymer and nanoparticle combination of claim 17, wherein the conductive nanoparticle is surrounded by hydrophilic moieties bonded thereto to increase solubility of the polymer and nanoparticle combination in water.

\* \* \* \* \*

UNITED STATES PATENT AND TRADEMARK OFFICE
CERTIFICATE OF CORRECTION

PATENT NO. : 8,920,681 B2
APPLICATION NO. : 12/650175
DATED : December 30, 2014
INVENTOR(S) : Choi Page 1 of 2

It is certified that error appears in the above-identified patent and that said Letters Patent is hereby corrected as shown below:

On the Title Page, in item (56), under "FOREIGN PATENT DOCUMENTS", in Column 2, Line 4, delete "WO WO 03095111 11/2003".

In the Specification

In Column 3, Line 34, delete "subtituents" and insert -- substituents --, therefor.

In Column 5, Line 52, delete "poly(styrenesulfonate)" and insert -- poly(styrenesulfonate). --, therefor.

In Column 5, Line 66, delete "can" and insert -- can be --, therefor.

In Column 6, Line 23, delete "thereofrom" and insert -- therefrom --, therefor.

In Column 6, Lines 46-47, delete "choloroform" and insert -- chloroform --, therefor.

In Column 8, Line 48, delete "R1" and insert -- $R_1$ --, therefor.

In Column 8, Line 50, delete "R1" and insert -- $R_1$ --, therefor.

In Column 10, Line 11, delete "substitutents" and insert -- substituents --, therefor.

In Column 11, Line 46, delete "hydrophillic" and insert -- hydrophilic --, therefor.

In Column 13, Line 58, delete "choloroform" and insert -- chloroform --, therefor.

In Column 13, Lines 62-63, delete "a electrically" and insert -- an electrically --, therefor.

In Column 14, Line 38, delete "("PAAMP SA")," and insert -- ("PAAMPSA"), --, therefor.

Signed and Sealed this
Twenty-first Day of July, 2015

Michelle K. Lee
*Director of the United States Patent and Trademark Office*

CERTIFICATE OF CORRECTION (continued)
U.S. Pat. No. 8,920,681 B2

In Column 14, Line 46, delete "(Bis-DAPDXP)," and insert -- (Bis-DAPOXP), --, therefor.

In Column 15, Lines 1-2, delete "starburstes," and insert -- starbursts, --, therefor.

In Column 17, Line 54, delete "C3-7" and insert -- $C_{3-7}$ --, therefor.

In Column 18, Line 13, delete "C3-7" and insert -- $C_{3-7}$ --, therefor.

In Column 18, Line 16, delete "subsituent" and insert -- substituent --, therefor.

In Column 19, Line 2, delete "benzothiopheneyl," and insert -- benzothiophenyl, --, therefor.

In Column 19, Lines 37-38, delete "benzthiazolyl, benztriazolyl, benztetrazolyl," and insert -- benzothiazolyl, benzotriazolyl, benzotetrazolyl, --, therefor.

In Column 20, Line 39, delete ""alkylthio,"" and insert -- "Alkylthio," --, therefor.

In Column 20, Line 42, delete "alyl" and insert -- allyl --, therefor.